United States Patent
Boccacci (10) Patent No.: US 9,375,031 B2
(45) Date of Patent: Jun. 28, 2016

(54) METHOD DEVICE FOR MAKING A FRUIT JUICE AND A CORRESPONDING CONTAINER

(76) Inventor: Gian Piero Boccacci, Parma (IT)

(*) Notice: Subject to any disclaimer, the term of this patent is extended or adjusted under 35 U.S.C. 154(b) by 90 days.

(21) Appl. No.: 14/344,971

(22) PCT Filed: Sep. 13, 2012

(86) PCT No.: PCT/IB2012/054764
§ 371 (c)(1),
(2), (4) Date: Mar. 14, 2014

(87) PCT Pub. No.: WO2013/038357
PCT Pub. Date: Mar. 21, 2013

(65) Prior Publication Data
US 2014/0322413 A1    Oct. 30, 2014

(30) Foreign Application Priority Data
Sep. 16, 2011  (IT) .............................. PR2011A0080

(51) Int. Cl.
*A23N 1/02*     (2006.01)
*A23L 2/04*     (2006.01)
*A23N 1/00*     (2006.01)
*A47J 19/02*    (2006.01)

(52) U.S. Cl.
CPC ... *A23N 1/02* (2013.01); *A23L 2/04* (2013.01); *A23N 1/003* (2013.01); *A47J 19/02* (2013.01)

(58) Field of Classification Search
CPC ............ A23L 2/04; A23N 1/003; A23N 1/02; A47J 19/02
See application file for complete search history.

(56) References Cited

U.S. PATENT DOCUMENTS

| | | | | |
|---|---|---|---|---|
| 1,471,336 A | * | 10/1923 | Johnson .................... | A23N 4/20 241/301 |
| 1,838,626 A | | 12/1931 | Harvey | |
| 2,274,020 A | * | 2/1942 | Weightman ............ | A23N 1/003 99/485 |
| 2,300,494 A | * | 11/1942 | Fothergill ............... | A47J 19/02 99/485 |
| 2,551,156 A | * | 5/1951 | Polk, Sr. .................. | A23N 4/18 426/482 |
| 2,575,584 A | | 11/1951 | Herman | |
| 2,630,849 A | * | 3/1953 | Williams ............... | A23N 1/003 99/504 |
| 2,631,625 A | * | 3/1953 | Wells ..................... | A23N 1/003 198/443 |
| 2,649,731 A | * | 8/1953 | Polk, Sr. ................. | A23N 1/003 100/105 |

(Continued)

FOREIGN PATENT DOCUMENTS

WO    2007148049 A1    12/2007
WO    2008068748 A2    6/2008

*Primary Examiner* — Anthony Weier
(74) *Attorney, Agent, or Firm* — David A. Guerra (57) ABSTRACT

Method for making a fruit juice and a container for said juice having the steps of:—procuring a fruit (9) having an outer rind (91) and containing pulp (92) inside it, said rind (91) externally delimiting an imaginary internal space (94) containing said pulp (92);—making a first hole (93) through the rind (91);—inserting a tool (30) through the first hole (93) into said imaginary space (94);—moving said tool (30) relative to the pulp (92) within the imaginary space (94) transforming the pulp (92) at least partly into juice, said juice being positioned within the imaginary space (94) delimited by the rind (91), said rind (91) acting as a container for the juice;—extracting said tool (30), the juice being substantially inside the rind (91) during the step of extracting the tool (30).

19 Claims, 4 Drawing Sheets

(56) References Cited

U.S. PATENT DOCUMENTS

| | | | | |
|---|---|---|---|---|
| 2,682,900 A | * | 7/1954 | Whitehead | A23N 1/003 99/504 |
| 2,705,984 A | * | 4/1955 | Harden | A23N 1/003 99/502 |
| 2,737,989 A | * | 3/1956 | Wurgaft | A23N 4/18 100/213 |
| 2,753,904 A | * | 7/1956 | Trainor | A23N 1/003 74/23 |
| 2,853,107 A | * | 9/1958 | Alexander | A23N 1/003 99/502 |
| 3,185,072 A | * | 5/1965 | Rickard | A23N 1/003 100/116 |
| 4,759,938 A | * | 7/1988 | Rohm | A23N 1/003 426/481 |
| 5,188,021 A | * | 2/1993 | Bushman | A23N 1/003 99/502 |
| 5,445,068 A | | 8/1995 | Michelson | |
| 2010/0143558 A1 | * | 6/2010 | Aharonovitch | A23N 1/00 426/489 |

\* cited by examiner

METHOD DEVICE FOR MAKING A FRUIT JUICE AND A CORRESPONDING CONTAINER

CROSS-REFERENCE TO RELATED APPLICATIONS

This application is an U.S. national phase application under 35 U.S.C. §371 based upon co-pending International Application No. PCT/IT2012/054764 filed on Sep. 13, 2012. Additionally, this U.S. national phase application claims the benefit of priority of co-pending International Application No. PCT/IT2012/054764 filed on Sep. 13, 2012 and Italian Application No. PR2011A000080 filed on Sep. 16, 2011. The entire disclosures of the prior applications are incorporated herein by reference. The international application was published on Mar. 21, 2013 under Publication No. WO 2013/038357 A1.

BACKGROUND OF THE INVENTION

1. Field of the Invention

The present invention relates to a method and a device for making a fruit juice and the corresponding container.

1. Description of the Prior Art

Methods for making a fruit juice are known wherein the fruit is cut into two halves and the pulp of each of these two halves is then squeezed through pressure or pressure torsion against a striker.

Such method necessarily requires the collection of the juice obtained through squeezing in an additional container (typically a glass).

However, maximum attention is required in order to reduce the risk of contaminating the product during the transfer of the juice in the container.

The use of normal containers (glasses or waterproof cases) introduces further disadvantages in terms of costs and disposal thereof. In addition, some containers are not always optimal for preserving beverages since they do not offer sufficient protection from UV rays or other external contaminants or they may be not chemically inert themselves.

SUMMARY OF THE INVENTION

In this context, the technical task on which the present invention is based is to propose a method and a device for making a fruit juice and relative container which overcome the above-mentioned disadvantages of the known art.

In particular, an important object of the present invention is to provide an extremely ecological and economical device and method, which aims to prevent any product contamination.

The technical task set and the objects specified are substantially attained by a method and a device, comprising the technical characteristics as set out in one or more of the accompanying claims.

BRIEF DESCRIPTION OF THE DRAWINGS

Further characteristics and advantages of the present invention will become more apparent from the following indicative, and hence non-limiting, description of a preferred, but not exclusive, embodiment of a device illustrated in the appended drawings, in which.

DETAILED DESCRIPTION OF THE INVENTION

In the appended figures reference number 1 indicates a device for making a fruit juice and a container for the fruit juice.

This device 1 comprises positioning means 2 for a fruit having:

rind;

pulp within the rind; the positioning means 2, at least in a first configuration for holding the fruit in place, define a housing 20 for the fruit. Device 1 comprises rind perforating means 3 and fruit pulp crushing means 3. The rind perforating means 3 and the fruit pulp crushing means 3 may or may not coincide with each other. The fruit pulp crushing means 3 comprise a rotary or vibratory tool 30. The rotary or vibratory tool 30 conveniently has a predetermined range of action and in the first configuration of the positioning means 2 it is at least partly inside the housing 20. Conveniently said range of action in the first configuration of the positioning means 2 is spaced apart from the positioning means 2.

The positioning means 2 comprise a first and a second opposing part 22, 21 which in the first configuration are close to each other in order to define said housing 20 and in a second configuration are spaced apart. In such second configuration, the first and the second part 22, 21 allow the positioning of the fruit in the housing 20 and the removal of the product of the process performed by device 1 (that is, the rind containing the juice). Conveniently, the first part 22 of the positioning means 2 is shaped like a first cap 81 (preferably semispherical). Conveniently, the second part 21 of the positioning means 2 is shaped like a second cap 82 (preferably semispherical). The first cap 81 defines a first concavity 810 and the second cap 82 defines a second concavity 820. The first concavity 81, at least in the first configuration, faces the second concavity 82. Advantageously, the second cap 82 at least in the first configuration of the positioning means 2 overlaps with the first cap 81. Advantageously, in the first configuration of the positioning means 2, the first part 22 is raised with respect to the second configuration. Advantageously, the movement of the positioning means 2 from the second to the first configuration envisages the raising of the first part 22 towards the second part 21. Advantageously, the device 1 comprises means for blocking vertical translation of the second part 21 of the positioning means 2, said second part 21 floating with respect to a horizontal axis.

Advantageously, the first cap 81 may contain deformable polymeric material in order to adapt to the external surface of the rind. This allows an improvement in the connection of the rind to the first cap 81 without having to use excessive pressure and without altering the shape of the rind.

The device 1 can comprise suction means having a conduit leading into the housing 20 (solution not shown). Said suction means, as well as improving the action of holding the fruit in place at the first cap 81 also allow the evacuation of any juice splashes, although minimal (for example, generated during the extraction of the tool 30). Advantageously, the conduit of the suction means leads into the first cap 81 (for example, through a vacuum nozzle).

Advantageously, the first cap 81 can be disassembled in order to facilitate cleaning. Conveniently, the second cap 82 can also be disassembled in order to improve its cleaning. Preferably, the tool 30 can also be disassembled. In particular, the tool 30 is equipped with a press coupling. Advantageously, the tool 30 is at least partly contained within the second concavity 820. Conveniently, the device 1 comprises means 83 for moving the first and the second part 22, 21 of the positioning means 2 towards/away from each other. Conveniently, means 83 for moving the first and the second part 22, 21 towards/away from each other comprise:

a guide 831 typically developing upwards;
a movable slide 832 along the guide 831, said slide 832 supporting the first part 22 of the positioning means 2.

Advantageously, the means 83 for moving the first and the second part towards/away from each other also comprise a first and a second bar 833, 834 mutually hinged. The first bar 833 is further hinged to said movable slide 832; the second bar 834 is also hinged to a support 835 supporting said second part 21 of the positioning means 2. Such support 835 is usually integral (or can be made integral) with said guide 831. Conveniently, a grip is applied to the second bar 834 in order to facilitate its rotation.

A rotation of such second bar 834 determines the movement towards or away from each other of the first and the second part 22, 21 of the positioning means 2. In particular, the raising or lowering of the slide 832 and therefore of the first part 22 of the positioning means 2, corresponds to the rotation of such second bar 834. In this way, there is a passage between the first and the second configuration of the positioning means 2. Conveniently, the device 1 comprises an upright 836 resting on a base 837. The upright 836 develops away from the base 837 (it is preferably vertical). The guide 831 is obtained on the upright 836.

Figure 1:
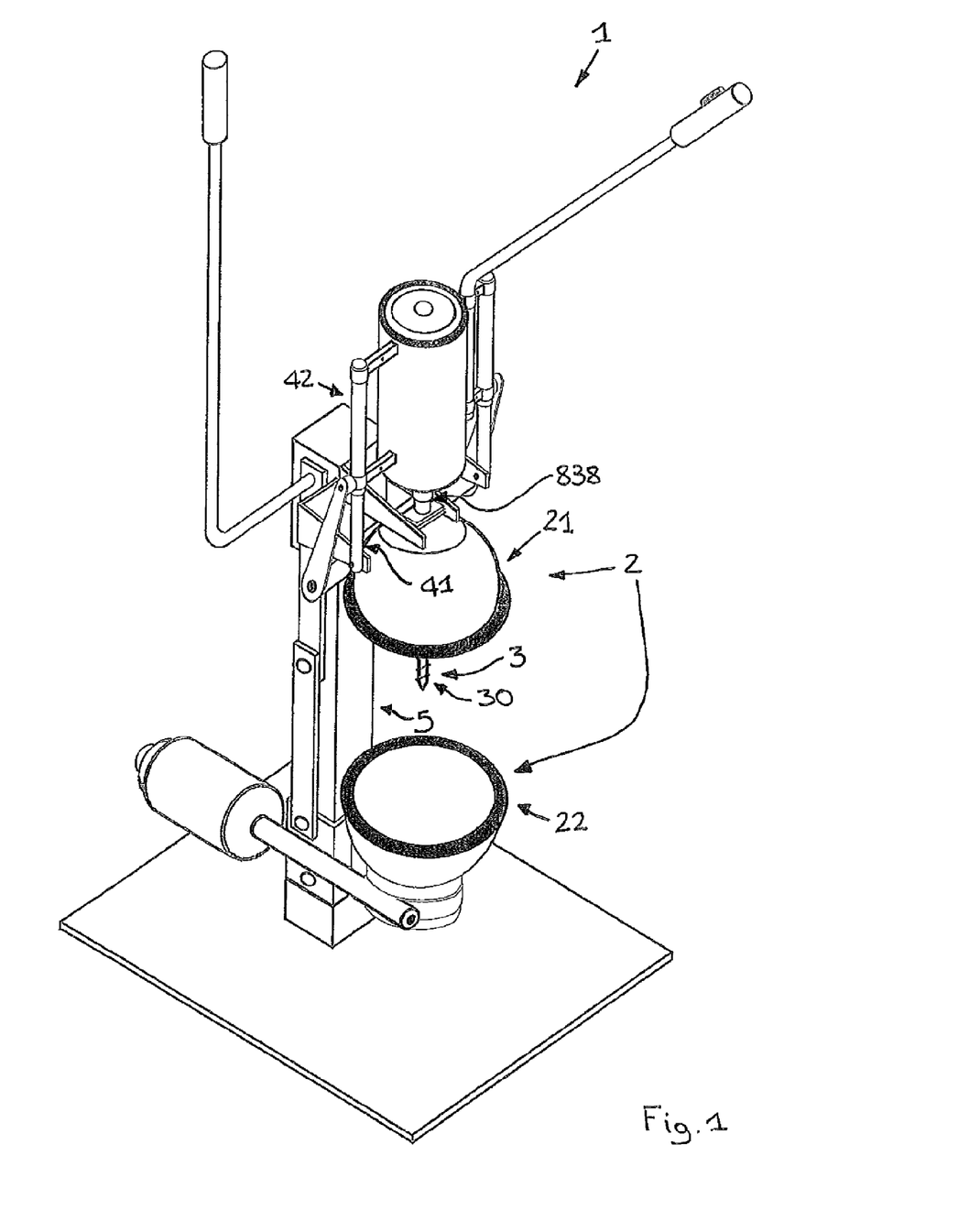
FIG. 1 shows a perspective view of a device according to the present invention.
Figure 2:
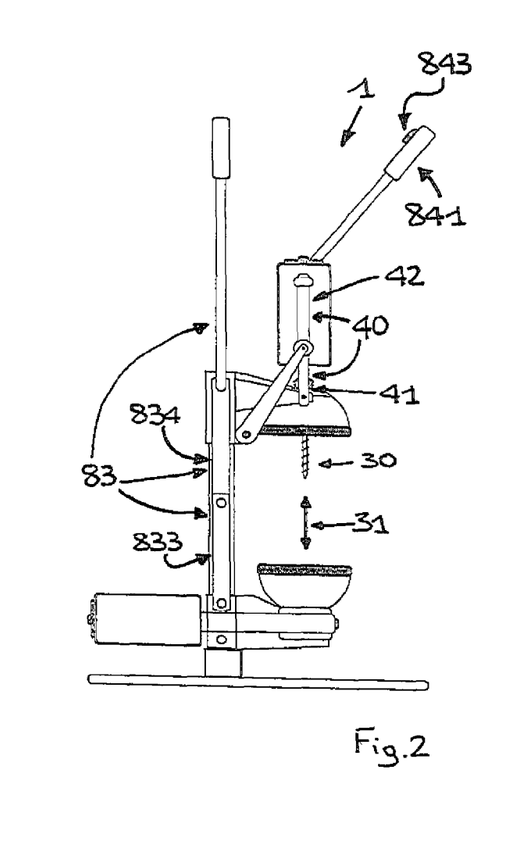
FIGS. 2, 3 and 4 show two opposite side views and a front view of the device according to the present invention, respectively.
Figure 3:
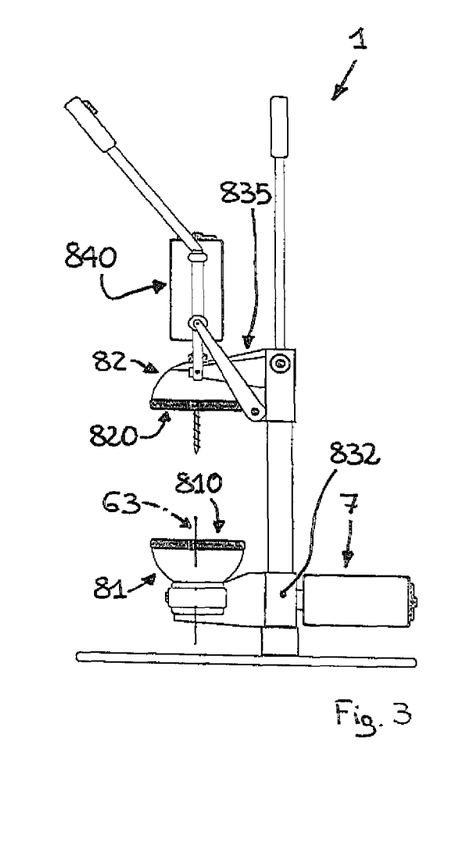
Figure 4:
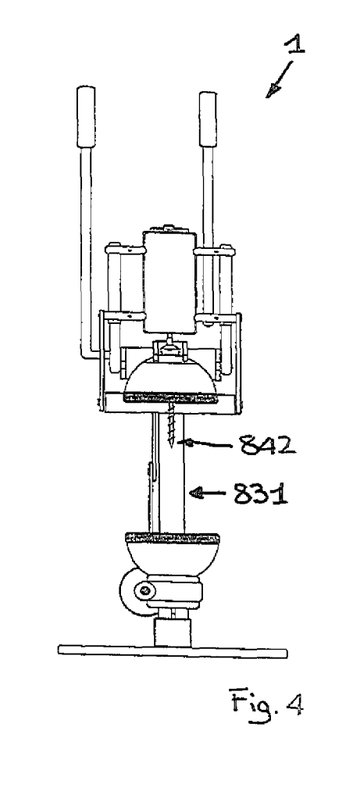
Figures 5, 6, 7, 8, 9:
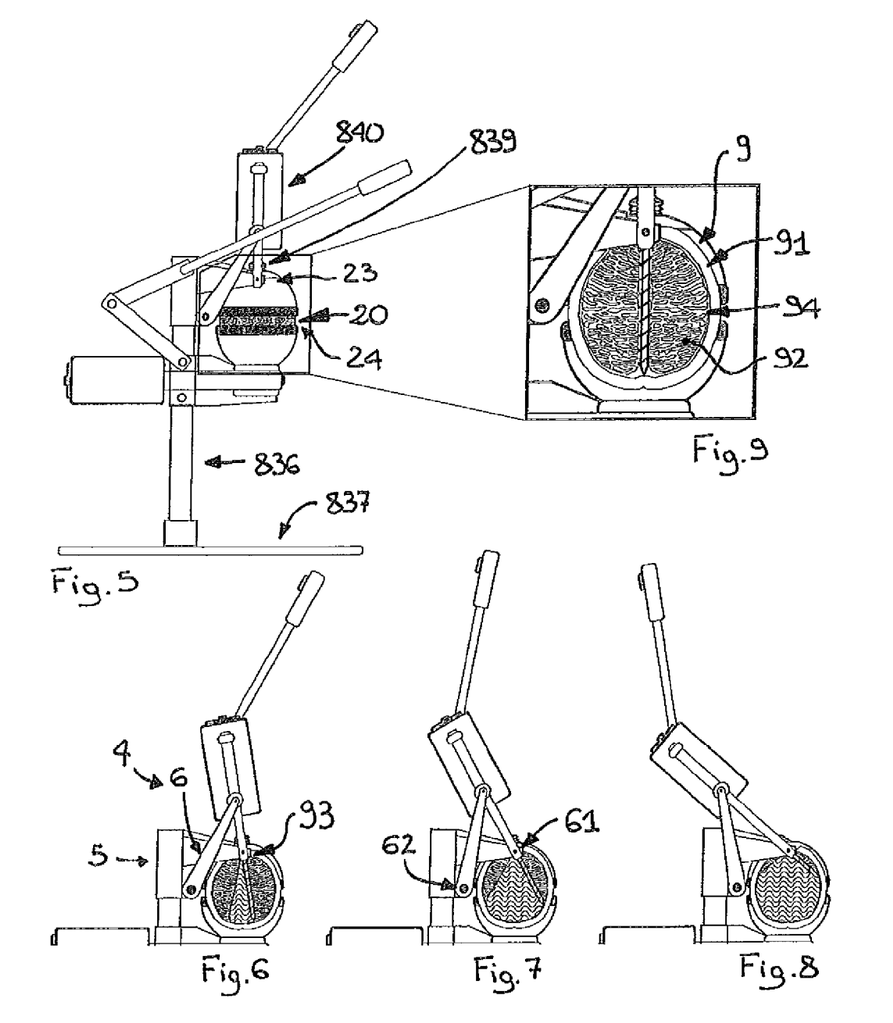
FIGS. 5, 6, 7 and 8 show in a sequence the steps of the method according to the present invention.
FIG. 9 shows an enlarged view of some parts removed in order to better highlight other parts of FIG. 5.

The device 1 comprises variation means 4 in a plane of inclination of the tool 30 relative to at least one portion of the positioning means 2 (FIGS. 6, 7 and 8 highlight the part of liquefied pulp and the part of pulp still to be liquefied). Typically, with respect to an absolute reference the angle of inclination of the tool is changed and not of the positioning means 2.

With reference to the exemplificative and non-limiting solution in the figures, the plane to which the variation means 4 refer is a vertical plane. The variation means 4 of the angle of inclination comprise:

a telescopic structure 40 in turn comprising a first and a second element 41, 42 one of which (typically the first element 41) can slide within the other;
a support frame 5 of said telescopic structure 40 rotatably connected to said first element 41 of the telescopic structure 40; the frame 5 is rotatably connected to the first element 41 around a first axis 61 of rotation; conveniently the frame 5 is part of the upright 836;
a rod 6 rotatably connected to said second element 42 of the telescopic structure 40 and to said frame 5, said rod 6 being rotatably connected to said frame 5 around a second axis 62 of rotation. The rotary tool 30 advantageously has a predominant longitudinal development. An extension or retraction of the telescopic structure 40 due to a relative movement of the first and the second element 41, 42 (see FIGS. 6, 7 and 8) corresponds to:
a variation in the inclination of a straight line oriented along the predominant longitudinal development of the tool (hence there is a variation in the inclination of the predominant longitudinal development);
a movement of the tool 30 along a variable direction identified by said straight line oriented along the predominant longitudinal development of the tool 30.

Conveniently such movement is a translation or a roto-translation. Over the course of the present application, the expression "a straight line oriented along the predominant longitudinal development of the tool" can be replaced by the expression "a straight line oriented along an axis of rotation of the tool 30 around itself". Conveniently, a movement of the second element 42 corresponds to a movement of the tool 30. In the exemplified solution illustrated, the second element 42 supports motorisation means 840 of the tool 30 that determine the rotation of the tool 30 around itself (around at least one straight line oriented along the predominant longitudinal development of the tool 30). In one particular embodiment the means 840 could determine the oscillation of the tool. Conveniently as the angle of inclination of the tool 30 varies, a straight line oriented along the direction of mutual insertion/extraction of the first and of the second element 41, 42 maintains a relative fixed and predetermined orientation with respect to a predetermined straight line oriented along the predominant longitudinal development of the tool 30. Conveniently the tool 30 develops away from the motorisation means 840 thereof. Conveniently the tool 30 is connected to the motorisation means 840 thereof through a quick connect coupling. Conveniently the tool develops at least partly inside a sheath 838. The tool 30 can move along its own longitudinal development relative to the sheath 838. Advantageously the tool 30 and the sheath 838 are coaxial. The sheath 838 prevents jets of juice being projected by centrifugal force outside the rind during the extraction of the tool 30 from the rind. Conveniently the sheath 838 is connected through bellows 839 to the second part 21 of the positioning means 2. This also allows the minimisation of the risk that any splashes of juice could be projected towards the outside during the extraction of the tool 30 from the fruit. The sheath 838 is advantageously placed between the motorisation means 840 of the tool 30 and the first cap 81.

In the first configuration of the positioning means 2 a first horizontal plane passing through the first axis 61 of rotation overlaps with a second horizontal plane passing through the second axis 62 of rotation.

In the first configuration of the positioning means 2 the first axis 61 of rotation transits close to an upper portion 23 of the housing 20. In the first configuration of the positioning means 2 said second axis 62 of rotation transits close to a central portion 24 of the housing 20. In particular, the second axis 62 of rotation lies close to a horizontal plane that passes through the geometric barycentre of the housing 20. This is very important since it allows a rotary trajectory of the tool 30 so as to allow much of the pulp to be reached whilst containing the dimensions of the hole in the fruit. The first and the second axis 61, 62 of rotation are horizontal.

Conveniently the means of variation 4 of the angle of inclination comprise a pick-up zone 841 by a user. This pick-up zone 841 is integral with said second element 42. In particular said pick-up zone 841 is integrated into an arm integral with the second element 42.

Conveniently the device 1 comprises means 7 for moving the first part 22 of the positioning means 2 around a third axis 63 of rotation. Conveniently the third axis of rotation is parallel to (preferably is fully contained in) the plane in which the variation of the angle of inclination of the tool 30 takes place. In the preferred solution the third axis 63 of rotation is vertical. Conveniently the third axis 63 of rotation at least in the first configuration of the positioning means 2 develops parallel to the development direction of the guide 831. Conveniently the third axis 63 of rotation in the first configuration of the positioning means 2 is parallel to a movement direction of the slide 832 with respect to the guide 831. On this point conveniently the means 7 for moving the first part 22 of the positioning means 2 around the third axis 63 are motorised. The means 7 for moving the first part 22 of the positioning means 2 are advantageously supported by said slide 832. The means 7 for moving the first part 22 advantageously comprise a ratiomotor unit. The rotation of the first part 22 of the positioning means 2 causes the rotation by dragging of the fruit placed in the housing 20. The second part 21 of the positioning means 2 (the second cap 82) is free to rotate idly around said third axis 63 of rotation. During use it will in fact be dragged in rotation by the fruit (and/or by the first part of the positioning means 2) which will transmit the rotary motion received from the first part 22 of the positioning means 2 to it. Conveniently said arm, more specifically said pick-up zone 841, comprises a drive selector 843 of:

said means 7 for moving the first part 22 around the third axis 63 of rotation;
said motorisation means 840 of the tool 30.
Conveniently the selector 842 simultaneously drives:
the motorised means 7 for moving the first part 22;
the motorisation means 840 of the tool 30 on itself.

The rotary tool 30 has a predominant longitudinal development. Conveniently the tool 30 comprises a hollow rod. The cavity of the rod develops along the predominant development direction of the tool. The rod can therefore be tubular and have an injection hole for additives and/or releasing the working pressure. This allows additives to be introduced into the fruit juice obtained from the fruit pulp (these additives can be drinks or ice-cream for example). Furthermore this hole allows a reduction in the pressure that is created during the process. The hole is in fluid communication with the cavity of the rod. On this point, the injection hole is obtained at one end of the tool 30 or along a lateral surface of the tool, preferably close to the tip. Conveniently the tool 30, in particular the rod, is therefore tubular. It is tubular to allow the passage (for example in a controlled way) of fluids (for example the additives and/or fluids indicated above whose extraction allows a reduction in the working pressure). This passage of fluids is bidirectional. The rod is tubular, but does not envisage the passage of mechanisms inside it. The lateral surface of the rotary tool 30 normally comprises at least one cutting edge (see for example FIGS. 10-14). Conveniently the tool 30 is rigid. Conveniently the tool 30 is not deformable during normal operation. Conveniently the tool 30 (in particular the rod of the tool 30) is free from articulation zones. Conveniently the transfer of the motion to the tool 30 intended to come into contact with the inside of the fruit takes place in a zone that is intended to remain outside the fruit.

The fact that the tool 30 is rigid (for example made of steel) and/or that there are no articulation points inside the fruit increases the operating reliability preventing any breakages of the tool inside the fruit and preventing overheating of the fruit pulp.

Figure 10:
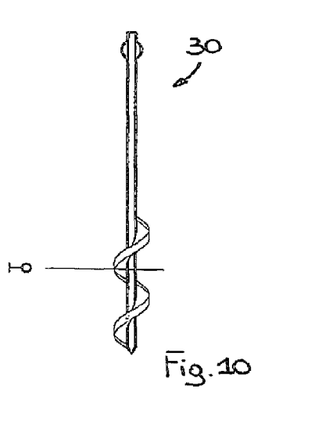
FIGS. 10, 11, 12, 13 and 14 show views of a component of the device according to the present invention.
Figure 11:
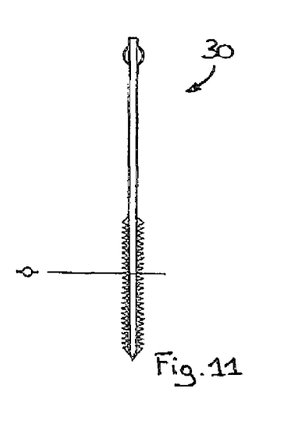
Figure 12:
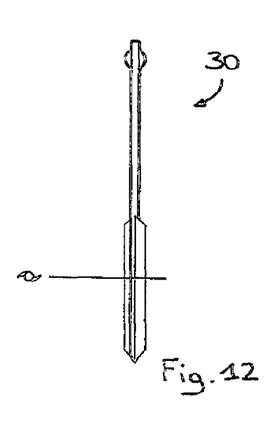
Figure 13:
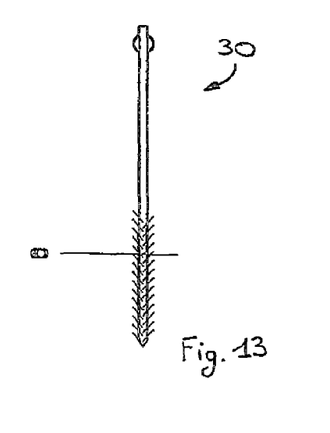
Figure 14:
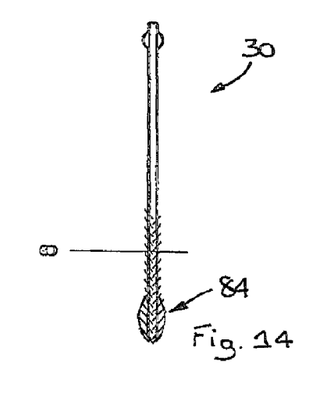

This cutting edge can have a helical development (FIG. 10). Alternatively the cutting edge in an orthogonal plane to the predominant development of the tool 30 can have a curvature defining a concavity (a cutting edge with such a section can develop in a straight line—see FIG. 12—or unwind helically—solution not shown—). The tool 30 can comprise a plurality of cutting edges inclined towards the tip of the cutting edge (FIG. 13 or 14) or have a plurality of toothed ribs that develop at right angles to the axis of rotation of the cutting edge 30 (see FIG. 11). The tool 30 could have an ogival swelling 844 in correspondence with the tip 842 (hence permitting better operation in correspondence with the tool insertion hole into the fruit, see FIG. 14). Over the course of the present description whenever the tool 30 is vibratory and not rotary, instead of an axis of rotation on itself of the tool, an axis of predominant longitudinal development of the tool is meant.

The operation of the device 1 is automatable (in this way once the operation is started, the various squeezing steps take place in succession without needing human intervention).

The invention also relates to a production method of a fruit juice and a container for said juice. Conveniently the method envisages the use of a device 1 having one or more of the technical characteristics described above.

The method comprises the step of procuring a fruit 9 comprising an outer rind 91 and containing pulp 92 inside it, said rind 91 externally delimiting an imaginary internal space 94 containing said pulp 92. For example this fruit may be a citrus fruit, typically an orange.

The method also comprises the steps of:
making a first hole 93 through the rind 91 (conveniently, but not necessarily the step of making the first hole 93 envisages making said first hole 93 in correspondence with the petiole of the fruit);
inserting a tool 30 through the first hole 93 into said imaginary space 94. Conveniently the step of making the first hole 93 is performed by said tool 30.

Advantageously the step of inserting the tool 30 into the imaginary space 94 is stopped before the tool 30 reaches the part of the rind 91 diametrically opposite the first hole 93. This allows a safe distance to be kept from the rind 91. The rind 91 does not have a through hole in the lower portion.

Conveniently the method can envisage the step of refrigerating the fruit before inserting the tool 30 through the first hole 93 into the imaginary space 94.

The refrigeration allows the fruit to be made more compact and hence facilitates the insertion of the tool 30.

Conveniently the step of inserting the tool 30 into the imaginary space 94 is preceded by the step of positioning said fruit in at least a first part 22 of the positioning means 2 of the fruit. The method also comprises the step of moving the first part 22 of the positioning means 2 with respect to the tool 30 from a configuration in which the fruit is moved away from the tool 30 to a configuration in which the tool 30 is at least partially inserted into the fruit (by way of example see FIG. 5). This, for example, envisages the raising of the first part 22. The step of moving the first part 22 of the positioning means 2 with respect to the tool comprises the step of inserting a tool 30 through the first hole 93 into said imaginary space 94. The step of inserting the tool 30 through the first hole 93 into the imaginary space 94 envisages that a movement zone of the tool 30 in which the tool receives the motion from a driving organ remains outside the imaginary space 94. The step of moving the first part 22 of the positioning means 2 also envisages making said first hole 93. With respect to an absolute reference advantageously the step of moving the first part 22 of the positioning means 2 with respect to the tool envisages moving the first part 22 of the positioning means 2 towards the tool 30.

The method also envisages the step of moving said tool 30 relative to the pulp 92 within the imaginary space 94 transforming the pulp 92 at least partly into juice, said juice being positioned within the imaginary space 94 delimited by the rind 91, said rind 91 acting as a container for the juice (see FIGS. 6, 7, 8). The juice is more liquid than the natural consistency of the pulp from which it is obtained and is such as to allow human consumption using a straw. Typically a user can therefore easily suck the fruit juice through a straw. The fruit juice obtained from the pulp is generated directly inside the fruit and is never extracted from the container 10 until the fruit juice is consumed (drunk) by a user.

The step of moving said tool 30 conveniently comprises the step of making said tool 30 rotate around itself (advantageously around an axis of rotation coinciding with the predominant longitudinal development of the tool 30). In particular, this allows the pulp 92 to be crushed to transform it at least partially into juice. The pulp 92 is then at least partly liquidised by the tool 30. The liquidising of the pulp 92 allows a cavity to be made inside the rind 91, said cavity being occupied at least partially by the juice. In an alternative solution, the step of moving said tool 30 conveniently comprises the step of making the tool 30 vibrate (this being able to happen at the same time as the step of changing the angle of inclination of the tool 30).

The method also comprises the step of extracting said tool 30 from the rind 91 and from the imaginary space 94. The juice is substantially inside the rind 91 during the step of extracting the tool 30. Hence the rind 91 houses the juice protecting it.

The step of moving said tool 30 envisages varying the relative angle of inclination of the tool 30 with respect to a direction 31 of insertion of the tool 30 into the fruit 9. Conveniently the step of varying the angle of inclination of the tool 30 takes place at least partly simultaneously with the step of making said tool 30 rotate to crush the pulp 92 to transform it at least partially into juice.

The step of varying the angle of inclination of the tool envisages moving the tool 30 while keeping it parallel to a plane. The trajectory of the tool 30 during the inclination thereof is hence planar. In the maximum inclination position of the tool 30, the tool 30 is inclined by about 70° with respect to the direction of insertion of the tool 30 into the fruit. The step of varying the angle of inclination of the tool 30 envisages varying the angle of inclination of:
  a straight line parallel to the predominant development of the tool 30 and/or
  an axis of rotation of the tool 30 around itself.

The step of varying the angle of inclination of the tool comprises the step of increasing the angle of inclination of the tool 30 with respect to the direction of insertion, the step of increasing the angle of insertion of the tool 30 determining a partial extraction of the tool 30 from said imaginary space 94. The step of moving said tool 30 inside the imaginary space 94 takes place without making through holes in the rind 91 in addition to the first hole 93.

The step of moving said tool 30 relative to the pulp 92 also envisages making the fruit rotate around itself around an axis of rotation (typically a first straight line parallel to the direction of insertion of the tool 30 into the fruit); by way of example the first straight line passes through the first hole 93. Advantageously this take takes place simultaneously to the step of varying the angle of inclination of the tool 30. Conveniently this step of making the fruit rotate around an axis of rotation envisages moving at least part of the positioning means 2 of the fruit to drag the fruit in rotation. In particular the step of making the fruit rotate envisages making at least the first part 22 of the positioning means 2 rotate.

Advantageously the step of extracting said tool 30 from the rind 91 and the imaginary space 94 envisages moving the first part 22 of the positioning means 2 away from the tool 30 after positioning the latter parallel to the direction of insertion of the tool 30 into the fruit.

The invention thus conceived allows many advantages to be obtained.

In particular, it enables to avoid decanting the fruit juice and the consequent exposure to agents that could compromise the drink. It also allows to obtain not only the juice, but also a strong fibrous part of the fruit thanks to the crushing of the pulp (whenever the juice is obtained by simple squeezing the fibrous part usually remains connected to the rind and therefore disposed of along with the latter).

The use of a container according to the present invention (that is, comprising the rind of the fruit itself) allows to prevent the use of industrial containers that have their own cost and that could be made out of vitreous, metallic or polymeric materials, implying prior sterilisation, high cost and a non-infallible outcome. Furthermore, the use of an industrial container introduces problems connected with the disposal thereof (generation of waste, costs connected with correct disposal, etc.).

The rind as a natural protective container is a totally biodegradable component and therefore to be thrown away. The rind also offers high protection against light and atmospheric agents.

The juice obtained can also be added with liqueurs, syrups or other substances according to the consumer's preferences.

The invention thus conceived is susceptible to numerous modifications and variants, all falling within the scope of the inventive concept which characterises it.

Moreover, all the details may be replaced with other technically equivalent ones. In practice, all of the materials used, as well as the dimensions, can be any whatsoever according to need.

The invention claimed is:

1. A device for making a fruit juice and a container for the fruit juice, said device comprising:
   a positioning means of a fruit having a rind and pulp inside the rind, said positioning means, at least in a first configuration of holding the fruit in place, defining a housing for accommodating the fruit;
   a rind perforating and fruit pulp crushing means comprising a tool which, in said first configuration of said positioning means, is at least partly inside said housing and has a predetermined range of action; and
   a means for varying in a plane of an angle of inclination of said tool with respect to said positioning means, said means for varying the angle of inclination comprising:
      a structure comprising a first and a second element, one of said first and second element being able to slide inside the other;
      a frame supporting said structure and rotatably connected to said first element of said structure, said frame being connected to said first element rotatably about a first axis of rotation; and
      a third element which is rotatably connected to said second element of said structure and to said frame, said third element being connected to said frame rotatably about a second axis of rotation;
   wherein said first and second element pivot about said first axis of rotation to correspond with the angle of inclination of said tool;
   wherein said tool of said rind perforating and fruit pulp crushing means being selected from the group consisting of a rotary tool, a vibratory tool, and a rotary and vibratory tool.

2. The device according to claim 1, wherein extension or retraction of said structure linked to a movement of said first element relative to said second element causing:

a variation of said angle of inclination of a first straight line, said first straight line being oriented along a tool rotation axis about which said tool rotates in a direction selected from the group consisting of around itself, and along a predominant longitudinal development of said tool; and
a movement of said tool along a variable direction defined by said tool rotation axis of rotation of said tool.

3. The device according to claim 2, wherein in said first configuration of said positioning means said first axis of rotation is configured to move adjacent to an upper portion of the rind.

4. The device according to claim 1, wherein said positioning means further comprise a first and a second part, which are mutually opposed and which, in said first configuration, are close to each other to define said housing and, in a second configuration, are spaced apart to allow positioning of the fruit and removal of the rind containing the juice.

5. The device according to claim 4, wherein said device further comprises means for moving said first part and said second part of said positioning means about a third axis of rotation, said third axis of rotation in said first configuration being parallel to said plane in which said angle of inclination of said tool is varied.

6. The device according to claim 5, wherein said first configuration of said positioning means said first part is raised with respect to said second configuration.

7. The device according to claim 6, further comprises means for blocking a vertical translation of said second part of said positioning means, said second part floating with respect to a horizontal axis.

8. The device according to claim 7, further comprises suction means comprising a conduit leading into said housing, said first part of said positioning means being a first cap, said suction means improving an action of holding the fruit in place at said first cap and allowing an evacuation of any fruit juice splashes.

9. The device according to claim 8, wherein said tool is rigid, does not have articulation points, and comprises a moving area where said tool receives a motion from a driving organ, in use said moving area being destined to stay outside the fruit.

10. The device according to claim 9, wherein said tool further comprises a hollow stem, said stem being tubular and has a hole defined for injecting additives and for releasing a machining pressure, said stem being configured to allow the bidirectional passage of fluids.

11. The device according to claim 5, wherein said means for moving said first part about said third axis further comprises:
 a guide developing upwards;
 a slide movable along said guide, said slide supporting said first part of said positioning means; and
 a first and a second bar mutually hinged, said first bar being further hinged to said slide, said second bar being hinged to a support supporting said second part of said positioning mean.

12. The device according to claim 11, wherein a rotation of said second bar determines the movement towards or away from each other of said first and said second parts of said positioning means, wherein movement of said slide, and therefore of said first part of said positioning means, corresponds to a rotation of said second bar.

13. The device according to claim 4, wherein said means for moving said first and second parts is motorized for a translation selected from the group consisting of linear translation, and rotating translation.

14. A method for making a fruit juice and a container for the fruit juice, said method comprising the steps of:
 procuring a fruit comprising an outer rind and containing pulp inside the fruit, the outer rind externally delimiting an internal space containing the pulp;
 positioning the fruit in a housing capable of holding the fruit in at least in a first configuration;
 making a first hole through the outer rind;
 inserting a tool through said first hole into the internal space of the fruit, said tool being selected from the group consisting of a rotary tool, a vibratory tool, and a rotary and vibratory tool;
 moving said tool relative to the pulp within the internal space to transform at least part of the pulp into a juice, the juice remaining inside the internal space delimited by the rind, the outer rind acting as a container for the juice;
 varying a relative angle of inclination of said tool with respect to a direction of insertion of said tool into the fruit, the varying the relative angle of inclination being associated with a means of varying the angle of inclination comprising:
  a structure comprising a first and a second element, one of said first and second element being able to slide inside the other;
  a frame supporting said structure and rotatably connected to said first element of said structure, said frame being connected to said first element rotatably about a first axis of rotation; and
  a third element which is rotatably connected to said second element of said structure and to said frame, said third element being connected to said frame rotatably about a second axis of rotation;
  wherein said first and second element pivot about said first axis of rotation to correspond with the angle of inclination of said tool; and
 extracting said tool, the juice being substantially inside the internal space during said step of extracting said tool.

15. The method according to claim 14, wherein said step of moving said tool further comprises the step of beating the pulp to transform the pulp at least partly into the juice.

16. The method according to claim 14, wherein said step of varying said relative angle of inclination of said tool and of the fruit further comprises moving said tool while keeping said tool parallel to a plane.

17. The method according to claim 16, wherein said step of varying said relative angle of inclination of said tool and of the fruit comprises the step of increasing said angle of inclination of said tool with respect to said direction of insertion, said step of increasing said relative angle of inclination of said tool and of the fruit causing said tool to be partially extracted from the internal space.

18. The method according to claim 17, wherein said step of moving said tool relative to the pulp further comprises making the fruit rotate around itself about a straight line parallel to said direction of insertion of said tool into the fruit, said step of making the fruit rotate being at least partly simultaneous with said step of varying said angle of inclination of said tool.

19. The method according to claim 14, wherein said step of moving said tool within the internal space is accomplished without making through holes in the outer rind, the outer rind having only the first hole.

* * * * *